United States Patent [19]

Paul et al.

[11] 4,052,559

[45] Oct. 4, 1977

[54] NOISE FILTERING DEVICE

[75] Inventors: James E. Paul, Anaheim; Visvaldis A. Vitols, Orange, both of Calif.

[73] Assignee: Rockwell International Corporation, El Segundo, Calif.

[21] Appl. No.: 752,711

[22] Filed: Dec. 20, 1976

[51] Int. Cl.² ............................................. H04B 1/12
[52] U.S. Cl. ................................. 179/1 P; 333/70 T
[58] Field of Search ............... 179/1 D, 1 P; 330/70 T

[56] References Cited

U.S. PATENT DOCUMENTS

| | | | |
|---|---|---|---|
| 3,617,948 | 11/1971 | Lucky | 330/70 T |
| 3,659,229 | 4/1972 | Milton | 330/70 T |
| 4,000,369 | 12/1976 | Paul | 179/1 P |

*Primary Examiner*—Kathleen H. Claffy
*Assistant Examiner*—E. S. Kemeny
*Attorney, Agent, or Firm*—H. Frederick Hamann; Rolf M. Pitts; George Jameson

[57] ABSTRACT

Noise such as hum (whose components are self-correlated over a long time-interval) is estimated (separated) from Signal such as speech (whose components are self-correlated only over a short time-interval) by using a time-domain transversal filter, whose tap-weight coefficients may be fixed (Wiener filter) or variable (Adaptive filter). A combiner combines the estimated noise and original input signal to develop an output speech signal free of noise. The output speech may by further applied to a spectrum shaper to restore a natural shape.

12 Claims, 5 Drawing Figures

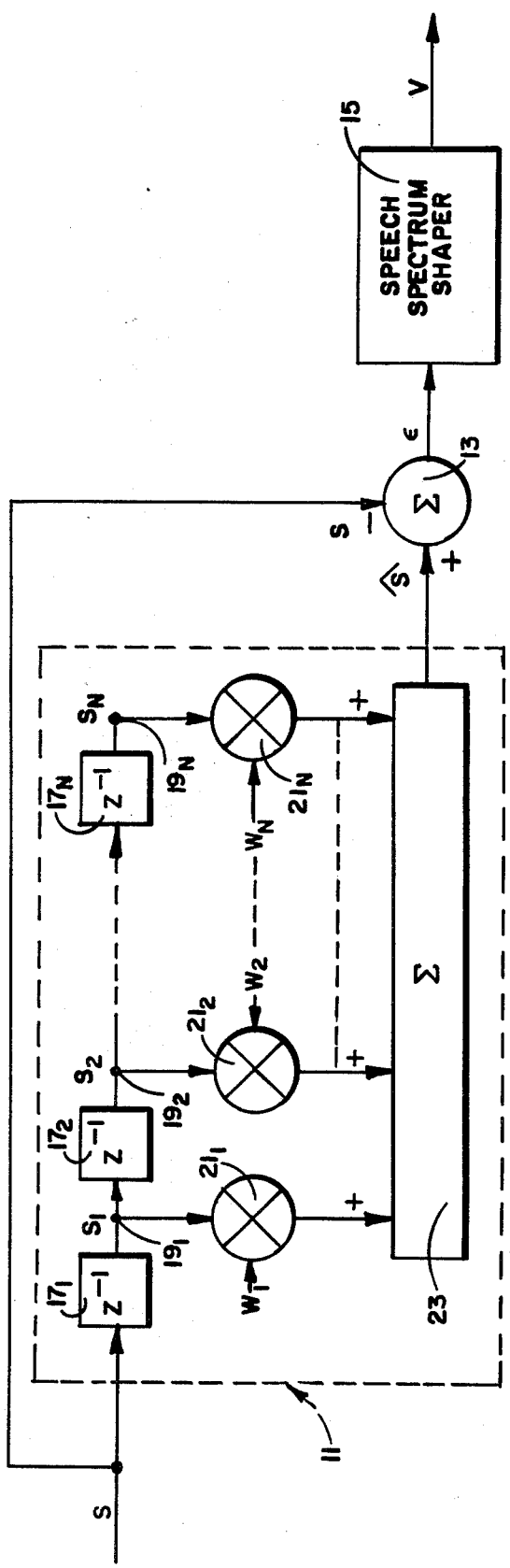
FIG. 1
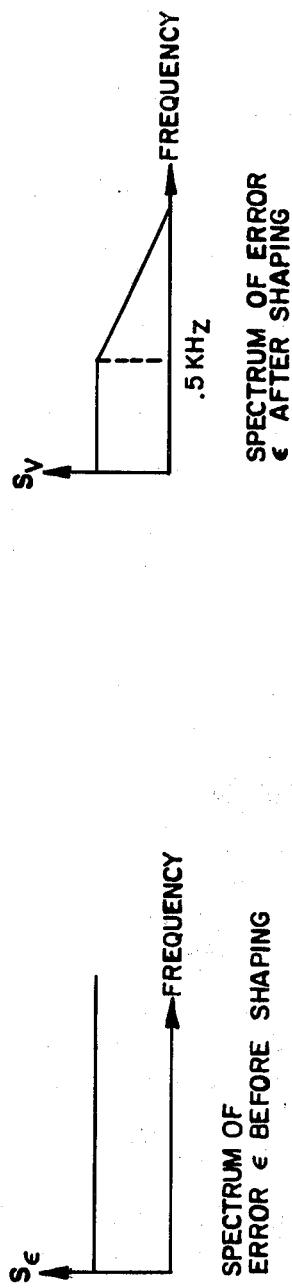
FIG. 2 SPECTRUM OF ERROR ϵ BEFORE SHAPING
FIG. 3 SPECTRUM OF ERROR ϵ AFTER SHAPING

NOISE FILTERING DEVICE

The invention described herein was made in the course of, or under, a contract or subcontract thereunder with the Law Enforcement Assistance Administration of United States Department of Justice.

BACKGROUND OF THE INVENTION

1. Field of the Invention

This invention relates to noise filters and particularly to a device for substantially removing undesired correlated signal components contained in the same frequency spectrum as desired uncorrelated signal components.

2. Description of the Prior Art

Many different prior art devices, apparatuses and systems have been proposed for separating or removing noise, intersymbol interference or different signal frequencies from an input signal.

U.S. Pat. Nos. 3,857,104 (Sacks) and 3,821,482 (Hirsch) are each directed to removing unwanted noise from a noise-bearing signal. U.S. Pat. No. 3,857,104 discloses an heuristic approach to automatically weighting the audio spectrum by de-emphasizing regions where noise is "detected". This system is incapable of converging to an optimal solution and does not make use of a transversal filter. U.S. Pat. No. 3,821,482 teaches an apparatus fo noise spectrum equalization of applied power spectrum samples for enhancing the detection of signals embedded in noise. This apparatus does not utilize a transversal filter. Furthermore, the operation of this apparatus is not applicable to time-domain signals.

U.S. Pat. No. 3,911,366 (Baghdady) discloses an apparatus for separating two frequency modulated signals occupying the same channel. Since acoustic speech is an amplitude modulated process, this apparatus cannot process acoustic speech. In addition, no transversal filter is involved in the operation of this apparatus.

U.S. Pat. Nos. 3,875,515 (Stuart et al); 3,868,603 (Guidoux); 3,727,153 (McAuliffe); 3,696,203 (Leonard) and 3,609,597 (Moye) each utilize an adaptive transversal filter or automatic equalizer in an arrangement to reduce the intersymbol interference resulting from the transmission of digital data signals through a channel.

U.S. Pat. Nos. 3,809,923 (Esser); 3,660,785 (Hosokawa) and 3,614,673 (Kang) each teach the use of a transversal filter or equalizer, but do not teach speech processing. U.S. Pat. No. 3,809,923 relates to a bucket-brigade mechanization of a transversal filter. U.S. Pat. No. 3,660,785 discloses a line equalizer. U.S. Pat. No. 3,614,673 relates to an adaptive line equalizer which derives its line characteristics from a single pulse.

U.S. Pat. No. 3,845,390 (De Jager et al) teaches a system for equalizing transmission channels using an ad hoc procedure.

U.S. Pat. No. 3,715,670 (Hirsch et al) employs transversal filters to make more efficient utilization of channel bandwidth with single-sideband or vestigal-sideband transmission of synchronous digital data over a channel of limited bandwidth.

None of the above-described prior art U.S. patents teaches, shows or suggests a speech filtering device which utilizes a transversal filter to provide an estimate of only the longer correlation time-period "noise" that is contained in an input speech-bearing signal and a subtractor to subtract the longer correlation time-period "noise" from the input speech-bearing signal to obtain substantially only the shorter correlation time-period speech component of the input speech-bearing signal as the signal remmant.

SUMMARY OF THE INVENTION

Briefly, as improved noise filtering device is provided for removing undesired correlated signal components, such as noises, hum, tones, echoes and acoustic resonances from degraded voice, music or other desired audio signals and recordings. In a first embodiment, a Wiener filter provides an estimate of the correlated signal components in an input voice signal, and a combiner subtracts the estimate of the correlated signal components from the input voice signal to develop an output voice signal which contains only uncorrelated signal components (in a long-term sense). The long term spectrum of the uncorrelated signal components can be restored to its desired shape by applying the output voice signal to a speech spectrum shaper. In a second embodiment, an adaptive transversal filter provides an estimate of the correlated signal components in a input voice signal, and a combiner subtracts the estimate from the input voice signal to develop an output voice signal which contains only uncorrelated signal (in a long term sense). The output voice signal, or a function thereof, is used to update the filter coefficients to enable the transversal filter to develop the estimate.

It is therefore an object of this invention to provide an improved noise filtering device.

Another object of this invention is to provide a compact, relatively simple and inexpensive device for removing long term correlated noise and acoustic effects from shorter term uncorrelated voice or other desired audio signals.

Another object of the invention is to provide a device for removing noise from, for example, law-enforcement, intelligence and aircraft crash voice recordings.

Another object of this invention is to provide a device for removing noise from speech signals by using least mean square estimates of correlated components of the speech signals.

Another object of this invention is to provide a device for removing noise from speech signals by using an adaptive filtering technique.

Another object of this invention is to provide a device which produces and combines the least mean square estimate of the correlated components of an input audio signal with the input audio signal in order to develop an output audio signal containing only uncorrelated signal components.

A further object of this invention is to provide a device for removing undesired correlated signal components such as noises, hums, tones, echoes and acoustic resonances from degraded voice, music or other desired audio signals and recordings without requiring a second signal source that is correlated with the undesirable signal components to be removed.

BRIEF DESCRIPTION OF THE DRAWINGS

These and other objects, features, and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 1 illustrates a block diagram of a first embodiment of the invention;

FIG. 2 illustrates the frequency spectrum of the output signal of FIG. 1;

FIG. 3 illustrates the reshaped frequency spectrum of the output signal of FIG. 1;

DESCRIPTION OF THE PREFERRED EMBODIMENTS

Figure 4:
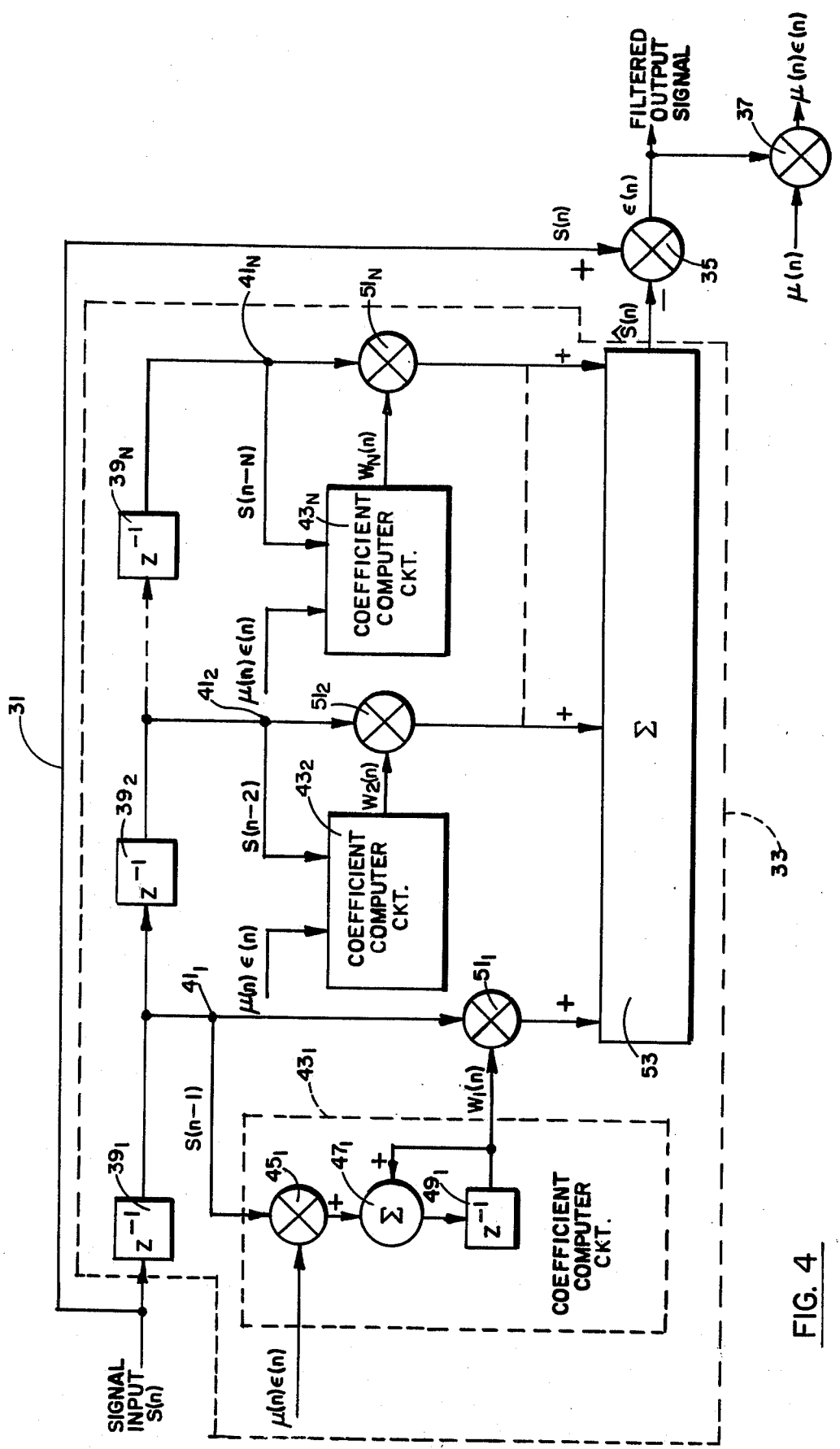
FIG. 4 illustrates a block diagram of a second embodiment of the invention.

Referring now to the drawings, FIG. 1 discloses a block diagram of a first embodiment of the invention. This first embodiment comprises a Wiener filter 11 and a combiner 13, and may also include a speech spectrum shaper 15.

An input signal S is applied to both the Wiener filter 11 and combiner 13. Assume that the input signal S contains both an undesired correlated component and a desired uncorrelated component. Noise, hums, acoustic and coustic resonances are examples of undesired correlated components, while speech, music and other desired audio signals or recordings are examples of the desired uncorrelated components. In all subsequent discussion of the invention, let the term "noise" mean any of these undesired signal components, and the term "speech" mean any of these desired signal components. Therefore, assume that the input signal S is a contaminated speech-bearing signal in which noise is the undesired component and a speech signal is the desired uncorrelated component.

The invention makes use of the fact that the desired speech component in the speech-bearing signal S is self-correlated over short intervals only, whereas the undesired noise component is self-correlated over longer intervals. As will be explained, by using the different correlation intervals or time-periods of the desired speech component and the undesired noise component, the invention subtracts the longer correlation interval noise from the input speech-bearing signal S, leaving the desired speech component (as well as any short correlation interval or uncorrelated "noise") as the signal remnant. Such removal of noise from a noise-contaminated, speech-bearing input signal can occur even when the desired speech component and undesired noise component occupy the same spectral region.

The Wiener filter 11 is a special type of fixed coefficient transversal filter which is implemented to develop an output least-mean-square (LMS) estimate $\hat{S}$ of its input speech-bearing signal S. Such a fixed Wiener filter 11 is used in this first embodiment when the characteristics of the undesired correlated effects (or noise) in the speech-bearing signal remain substantially constant over the time period of the autocorrelation function of the filter 11. The autocorrelation function of the Wiener filter 11, in a speech-filtering application, is computed over several seconds of signal S samples in order to eliminate undesired short-term correlated effects on the speech process.

In the implementation of the Wiener filter 11, the input signal S to be filtered is analyzed, the filter coefficients $W_1, W_2, \ldots, W_N$) are computed (to be explained) and then the Wiener filter is built using the previously computer values of filter coefficients as constants.

In operation, the input signal S is applied through a sequence of $Z^{-1}$ (one sample time delay) blocks $17_1, 17_2, \ldots 17_N$ (which together form a delay line) to respectively develop various sample time delayed signals $S_1, S_2, \ldots, S_N$ at their output taps $19_1, 19_2, \ldots 19_N$, respectively. These sample time delay signals $S_1, S_2, \ldots, S_N$ are respectively multiplied by preselected fixed filter coefficients $W_1, W_2, \ldots, W_N$ in multipliers $21_1, 21_2, \ldots 21_N$. The weighted signals $W_1S_1, W_2S_2, \ldots W_nS_N$ at the outputs of the multipliers $21_1, 21_2, \ldots 21_N$ are summed together in a summation circuit 23 to develop the least-mean-square estimate $\hat{S}$ of the input signal S.

The estimate $\hat{S}$ of the input signal S is applied to the combiner 13, which subtracts the estimate $\hat{S}$ from the input signal S to develop an error signal or signal remnant $\epsilon$, which is minimized in a LMS sense. Because the autocorrelation function of the Wiener filter 11 is computed over several seconds of samples of the input signal S and since the filter 11 is a linear estimator, the Wiener filter 11 can only estimate and pass those components (correlated components, e.g., noise) in the input signal S that have a correlation time period equal to or greater than the time period of the autocorrelation function of the filter 11. All signal components which have a shorter correlation time period (e.g., speech or music) are not estimated by the Wiener filter 11 and therefore subsequently comprise the error signal or signal remnant $\epsilon$ at the output of the combiner 13.

The following equations mathematically define the operation of the first embodiment of FIG. 1.

At the output of the Wiener filter 11, the estimated value $\hat{S}$ of the signal S is $$\hat{S} = W_1S_1 + W_2S_2 + \ldots W_NS_N \qquad (1)$$

$$= \sum_{j=1}^{N} W_j S_j$$

where:

$j$ = the number of delays in the delay line comprised of blocks $17_1, 17_2, \ldots 17_N$, $S_j$ = the individual delayed signal samples, and $W_j$ = the filter coefficients, with $j = 1, 2, \ldots, N$.

The error signal $\epsilon$ developed from subtracting the estimated value $\hat{S}$ from the input signal S is $$\epsilon = S - \hat{S} \qquad (2)$$

Substituting the value of $\hat{S}$ from equation (1) into equation (2)

$$\epsilon = S - \sum_{j=1}^{N} W_j S_j \qquad (3)$$

The operation to be minimized is $$E\{\epsilon^2\} = \text{minimum} \qquad (4)$$

where $E\{\epsilon^2\}$ is the expected value of the square of the error signal $\epsilon$.

By squaring both sides of equation (3), the expected value of $\epsilon^2$ becomes $$E\{\epsilon^2\} = E\left(S - \sum_{j=1}^{N} W_j S_j\right)^2 \qquad (5)$$

In equation (5) the minimum expected value of the error squared can be found by taking the partial derivative of $E\{\epsilon^2\}$ with respect to each coefficient and setting each partial derivative equal to zero. This yields the following set of N equations.

$$\frac{\delta E}{\delta W_k}\{\epsilon^2\} = 2E\left\{\left(S - \sum_{j=1}^{N} W_j S_j\right)S_k\right\} = 0 \quad (6)$$

$$k = 1, 2, \ldots, N$$

Equation (6) can be mathematically rewritten to obtain equation (7) as follows:

$$0 = 2E\left\{\left(S - \sum_{j=1}^{N} W_j S_j\right)S_k\right\} = E\left(SS_k - \sum_{j=1}^{N} W_j S_j S_k\right) \quad (7)$$

$$= E(SS_k) - E\left(\sum_{j=1}^{N} W_j S_j S_k\right)$$

$$= E(SS_k) - \sum_{j=1}^{N} W_j E\{S_j S_k\}$$

It will be recalled that the signal being minimized is correlated (stationary). The autocorrelation function of that correlated signal is given by $$E\{S_j S_k\} = R_{jk} \quad (8)$$

The estimated or computer value of $R_{jk}$ is given by equation (9).

$$R_j \approx \frac{1}{M} \sum_{n=1}^{M} S_j(n) S_k(n) \quad (9)$$

where:
$S_j(n)$ = value of $S_j$ at time $n$ (now),
$S_k(n)$ = value of $S_k$ at time $n$,
$j$ and $k$ = two different delays, and
$M$ = *several seconds of signal samples*

Substituting the autocorrelation function $R_{jk}$ of equation (8) into equation (7) produces equation (10)

$$\sum_{j=1}^{N} W_j R_{jk} = R_{ok}, k = 1, 2, \ldots, N \quad (10)$$

By using well-known numerical analysis techniques, the N equations in N unknowns that result from equation (10) can be solved for the filter coefficients $W_j$, where $j = 1, 2, \ldots, N$.

It should be recalled that, in the speech filtering application being described, the autocorrelation function of equation (9) is computed over several seconds of signal samples in order to eliminate undesired short-term correlated effects on the speech process.

By subtracting the estimate $\hat{S}$ from the input signal $S$, the error signal $\epsilon$ is obtained. This error signal $\epsilon$ is minimized in a LMS sense. It will be recalled that the input signal S contains both correlated components (e.g., noise, acoustic effects, etc.) and uncorrelated components (in a long-term sense) (e.g., speech, music and/or other non-stationary components). Since the Wiener filter 11 is a linear estimator, it can only develop an estimate $\hat{S}$ of the correlated components of the input signal S. This estimate $\hat{S}$ does not include uncorrelated components. Thus, the resulting error signal or signal remnant $\epsilon$ only contains the uncorrelated components (e.g., speech and/or music and the remaining uncorrelated noise components) of the input signal S.

As shown in FIG. 2, the resultant power spectrum of the error signal $\epsilon$ is flat. In order to retain the naturalness of the speech process produced by its characteristic long-term spectrum, the error signal $\epsilon$ can be applied to the speech spectrum shaper 15 for spectrum reshaping. The spectrum shaper 15 can be, for example, a first order low pass filter which has a flat response to approximately 500 Hz before falling off at a rate of 6 dB/octave at higher frequencies. Such spectrum shaping, as shown in FIG. 3, would give the error signal $\epsilon$ a long-term spectrum more closely resembling the original long-term speech signal, thereby restoring the natural power distribution to the spectrum of the speech remnant $\epsilon$. Techniques for implementing such a spectrum shaper are well known in the art.

Referring now to FIG. 4, a second embodiment of the invention is illustrated. Basically, this second embodiment utilizes a signal line 31, on adaptive transversal filter 33 and a combiner 35 to develop an output error signal or signal remnant $\epsilon(n)$. This error signal $\epsilon(n)$ is gain-scaled by a desired adaptation constant $\mu(n)$ in a multiplier 37 before being fed back to adaptively adjust the filter coefficients of the adaptive transversal filter 33.

Like the first embodiment, this second embodiment removes undesired correlated effects (such as noises, echoes, hums and resonances) from a contaminated input signal $S(n)$ (such as degraded voice, music or other desired audio signals and recordings) without requiring, as is usually required, a second signal source correlated with the undesirable effects to be removed. For purposes of the discussion of this second embodiment, assume that: the contaminated input signal $S(n)$ is a speech-bearing signal, the undesired correlated component is noise, and the desired uncorrelated component is a speech signal.

As discussed in relation to the first embodiment, the invention makes use of the fact that the desired speech component in the speech-bearing signal $S(n)$ is self-correlated over short intervals only, whereas the undesired noise component is self-correlated over longer intervals. The invention utilizes the different correlation intervals or time-periods of the desired speech component and the undesired noise component to derive and subtract the longer correlation interval noise from the input speech-bearing signal $S(n)$ in order to obtain only the desired speech component (as well as any short correlation interval "noise") as the signal remnant $\epsilon(n)$. This removal of the undesired noise component from a noise-contaminated, speech-bearing input signal $S(n)$ can occur even when the desired speech component and undesired noise component occupy the same spectral region.

In operation, the input signal $S(n)$ is applied to both the adaptive transversal filter 33 and to the combiner 35 by way of the signal path 31.

Within the filter 33, the signal $S(n)$ is applied through a sequence of $Z^{-1}$ (one sample time delay) blocks $39_1$, $39_2$, ..., $39_N$ (which together form a delay line) to respectively develop various sample time delayed signals $S(n-1)$, $S(n-2)$, ..., $S(n-N)$ at their equally time-spaced output taps $41_1$, $41_2$, ..., $41_N$, respectively. The number $n$ represents the $n$th time instant or sample, and the number N represents the number of the last tap in the filter 33.

Respectively coupled to the taps $41_1$, $41_2$, ..., $41_N$ are coefficient computer circuits $43_1$, $43_2$, ..., $43_N$ for updating the weights or coefficients $W_1(n)$, $W_2(n)$, ..., $W_N(n)$ as a function of the gain-scaled error signal, $\mu(n)\epsilon(n)$, from the multiplier 37. Since all of the coefficient computer circuits $43_1$, $43_2$, ..., $43_N$ are similar in structure and operation, only the circuit $43_1$ will be discussed.

The coefficient computer circuit $43_1$ is comprised of a multiplier $45_1$, a summer $47_1$ and a one sample time delay block $49_1$. The sample time delayed signal $S(n-1)$ from tap $41_1$ is applied to the multiplier $45_1$. The product signal $\mu(n)\epsilon(n)$, which is a function of the error ($\epsilon(n)$), is multiplied by the delayed signal $S(n-1)$ in the multiplier $45_1$ to develop a weight update signal associated with the tap $41_1$. This weight update signal, which at the present instant of time ($n$ or now) is equal to $82 (n)\epsilon(n) S(n-1)$, is summed in the summer $47_1$ with the present value (at time instant $n$) of the presently updated coefficient or weight $W_1(n)$ from the output of the one sample time delay block $49_1$. It should be noted that the output of the summer $47_1$ is the weight update signal $W_1(n+1)$ at the present time $n$ for the $W_1(n)$ filter coefficient or weight that will occur at the next instant of time $(n+1)$. The algorithm for determining the value of the updated weight or filter coefficient $W_1(n)$ at the output of the summer $47_1$ for the next instant of time is given by the equation $$W_1(n+1) = W_1(n) + \mu(n)\epsilon(n) S(n-1). \tag{11}$$

The output of the summer $47_1$ is applied to the input of the delay block $49_1$ with the output of the delay block $49_1$ being the filter coefficient $W_1(n)$.

In this manner the coefficient computer circuits $43_1$, $43_2$, ..., $43_N$ develop the updated filter coefficients $W_1(n)$, $W_2(n)$, ..., $W_N(n)$. The sample time delayed signals $S(n-1)$, $S(n-2)$, ..., $S(n-N)$ are respectively multiplied by these updated filter coefficients $W_1(n)$, $W_2(n)$, ..., $W_N(n)$ in multipliers $51_1$, $51_2$, ..., $51_N$ to develop adaptively weighted signals $W_1(n)S(n-1)$, $W_2(n)S(n-2)$, ..., $W_N(n)S(n-N)$, respectively. These weighted signals from the multipliers $51_1$, $51_2$, ..., $51_N$ are summed together in a summation circuit 53 to develop a least mean square (LMS) estimate $\hat{S}(n)$ of the input signal $S(n)$.

The estimate $\hat{S}(n)$ of the input signal $S(n)$ is subtracted from the input signal $S(n)$ in the combiner 35 to develop the error signal or signal remnant $\epsilon(n)$, which is minimized in a LMS sense. This error signal $\epsilon(n)$ is gain-scaled by a desired adaptation constant $\mu(n)$ in the multiplier 37 to produce the product signal $\mu(n)\epsilon(n)$, which is fed back to the coefficient computer circuits $43_1$, $43_2$, ..., $43_N$ to adaptively adjust the weights or coefficients $W_1(n)$, $W_2(n)$, ..., $W_N(n)$ of the adaptive transversal filter 33.

The adaptation constant $\mu(n)$ of the filter 33 is related to the input power $P_s(n)$ to the filter 33 and the adaptation time constant (in seconds) of the filter 33 by the expression $$T = 1/(2\mu(n)P_s(n)) \tag{12}$$

The adaptation time constant T indicates the length of time in seconds that it takes the filter 33 to adapt. For purposes of this invention, the adaptation time constant T is always selected to be longer (in time) than the desired uncorrelated components (and short-term correlated components) of the input signal $S(n)$, but shorter than the undesired longer-term correlated components (noise, etc.) to be removed from the input signal $S(n)$. Since, as discussed previously, new filter coefficients ($W_1(n)$, $W_2(n)$, ... $W_N(n)$) are computed for every input signal sample ($S(n)$), the adaptive transversal filter 33 only passes the long-term correlated noise components in the input signal sample $S(n)$. Thus, the output of the combiner 35, which receives both the filter 33 output and the input signal $S(n)$, comprises the signal remnant $\epsilon(n)$ having only the shorter correlation intervals.

Therefore, the adaptation time constant T is one of the input parameters of the filter 33 which is preselected for a particular desired application. For example, slow music has a T of 300 to 500 milliseconds, while speech has a T of 20 to 50 milliseconds. In the filtering application of a speech-bearing signal $S(n)$, that has been previously assumed, an adaptation time constant T of 100 milliseconds, or greater (between 100 and 300 milliseconds), has been found to be very effective in removing correlated noises and tones, echoes and room resonances. This is due to the fact that the filter 33 cannot change fast enough or adapt to the desired speech component in the input signal $S(n)$, but can adapt to the correlated noise (or signal) component. Thus, the estimate $\hat{S}(n)$ at the output of the filter 33 is an estimate of only the undesired long-term correlated components in the input signal $S(n)$.

Equation (12) can be rewritten to solve for the adaptation constant $\mu(n)$ as follows $$\mu(n) = 1/(2TP_s(n)) \tag{13}$$

In order for the filter 33 to be stable, the following adaptation constant $\mu(n)$ limits should be satisfied $$0 < \mu(n) < 2/(NP_s(n)) \tag{14}$$

where N = the number of taps in the filter 33.

The following equations mathematically define the overall operation of the second embodiment of FIG. 4.

$$\hat{S}(n) = \sum_{i=1}^{N} W_i(n) S(n-i) \tag{15}$$

where $S(n-i)$ are past samples of the input signal $S(n)$ and $i = 1, 2, ..., N$.

The error signal $\epsilon(n)$ developed from subtracting the estimated value $\hat{S}(n)$ from the inputs signal $S(n)$ is $$\epsilon(n) = S(n) - \hat{S}(n) \tag{16}$$

The $i$th filter coefficient at time sample $n+1$ is computed from the $i$th coefficient at time sample $n$ as follows $$W_i(n+1) = W_i(n) + \mu(n)\epsilon(n)S(n-i) \tag{17}$$

Figure 5:
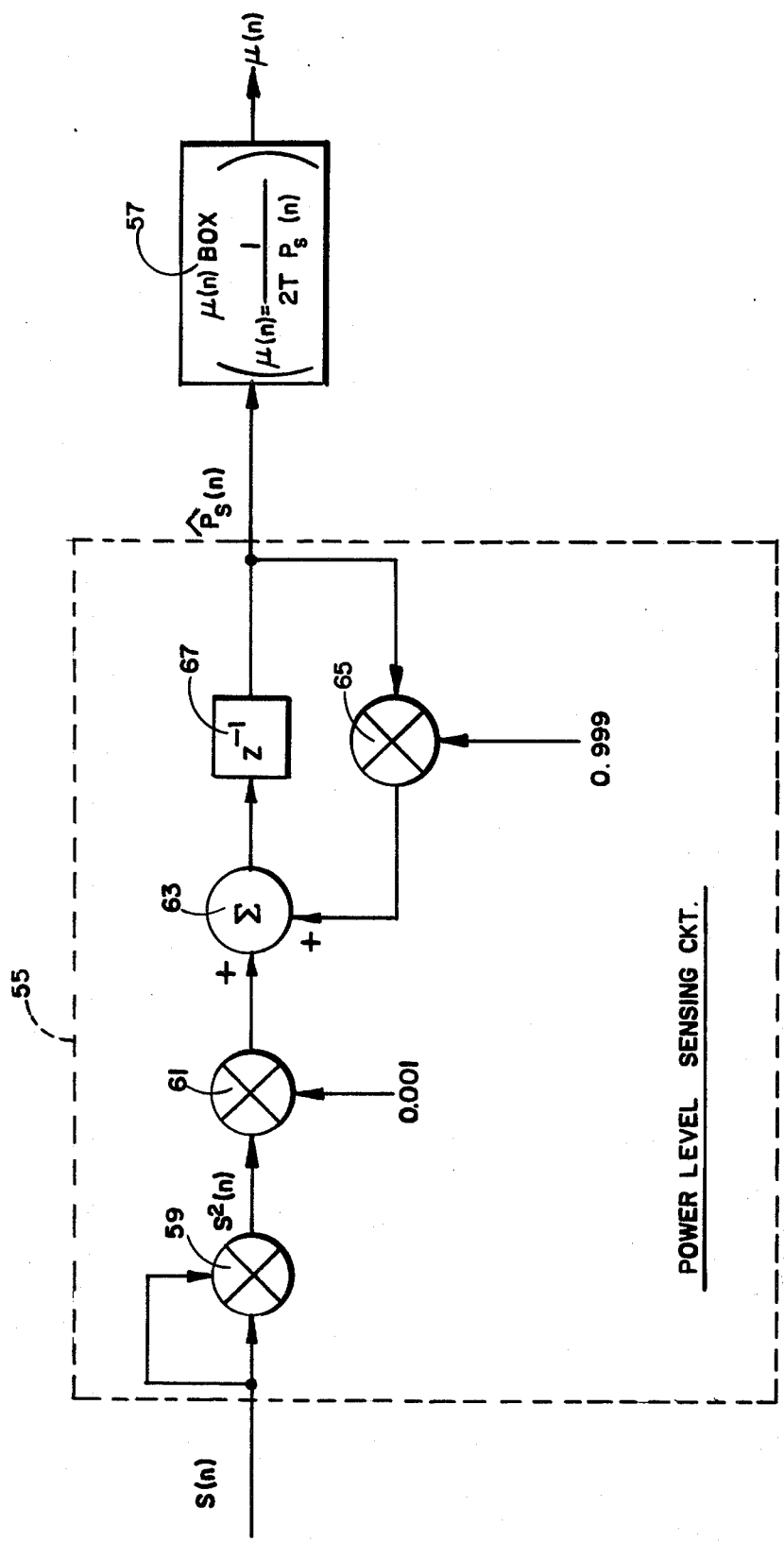
FIG. 5 illustrates an optional circuit for the second embodiment for providing an adaption constant $\mu$ that varies as a function of the power level of the input signal.

Referring now to FIG. 5, an automatic power level-sensing circuit 55 and a $\mu(n)$ box 57 are illustrated. The circuits 55 and 57 may be utilized in connection with the circuit of FIG. 4 in order to assure the stability of the adaptive transversal filter 33. The circuit 55 provides an estimate $\hat{P}_s(n)$ of the input power $P_s(n)$ to the filter 33 (FIG. 4) at each sampling time, while the circuit 57 utilizes the power estimate $\hat{P}_s(n)$ and the preselected adaptation time constant T to automatically adjust the adaptation constant $\mu(n)$ as a function of the estimated value $\hat{P}_s(n)$ of the input power $P_s(n)$ of the input signal $S(n)$.

The circuit 55 provides a power estimate $\hat{P}_s(n)$ by the following expression:

$$\hat{P}_s(n+1) = 0.999 \hat{P}_s(n) + 0.001 S^2(n) \tag{18}$$

The coefficients shown in equation (18) have been found suitable for noisy speech signals sampled from 7,000 Hz to 20,000 Hz.

The power level sensing circuit 55 is implemented according to equation (18). Input signal $S(n)$ is multiplied by itself in a multiplyier 59 is develop the signal $S^2(n)$. This signal $S^2(n)$ is then multiplied by the coefficient 0.001 in a multiplier 61 in order to develop the term $0.001 S^2(n)$. Term $0.001 S^2(n)$ is summed in summer 63 with the product of the present value (at time constant $n$) of the power estimate $\hat{P}_s(n)$ and the coefficient 0.999 from the output of a multiplier 65. The output of the summer 63 is applied through a one sample time delay block 67 to develop the present value of the power estimate $\hat{P}_s(n)$ at the output of the block 67. It should be noted that the output of the summer 63 is $\hat{P}_s(n+1)$, the value at the present time n for the power estimate $\hat{P}_s$ that will occur at the next instant of time $(n+1)$.

The $\mu(n)$ box 57 is implemented to develop the adaptation constant $\mu(n)$ according to equation (13). As stated before, the circuit 57 automatically adjusts the adaptation constant $\mu(n)$ as a function of the estimated value $\hat{P}_s(n)$ of the input power $P_s(n)$ of the input signal $S(n)$.

The invention thus provides a "noise" filtering device which utilizes a Wiener filter in a first embodiment (or an adaptive transversal filter in a second embodiment) to provide an estimate of only the longer correlation time-period "noise" that is contained in an input "speech"-bearing signal, and a subtractor to subtract the loner correlation time-period "noise" at the output of the filter from the input "speech"-bearing signal in order to obtain at the subtractor output substantially only the shorter correlation time-period "speech" component of the input speech-bearing signal as the signal remnant.

While the salient features have been illustrated and described in two emobidments of the invention, it should be readily apparent to those skilled in the art that modifications can be made within the spirit and scope of the invention as set forth in the appended claims.

We claim:

1. A device for removing undesired correlated components from an input degraded audio signal, said device comprising:
   filter means responsive to the input audio signal for substantially estimating only the undesired correlated components of the input audio signal; and
   a combiner for substracting the input audio signal from the estimate of the undesired correlated components to develop an output audio signal containing substantially no undesired correlated components.

2. The device of claim 1 wherein:
   said filter means is a Wiener filter which estimates the undesired correlated components in a least mean square sense.

3. The device of claim 1 wherein:
   said filter means is a tapped adaptive transversal filter.

4. The device of claim 1 further including:
   a speech spectrum shaper coupled to said combiner for reshaping the frequency spectrum of the output audio signal to make the output audio signal more natural in spectral content.

5. A filter device comprising:
   means for developing a least mean square estimate of the correlated components of an input signal which contains both correlated and uncorrelated signal components; and
   means for combining the least mean square estimate with the input signal to develop an output signal containing only uncorrelated signal components.

6. The filter device of claim 5 wherein:
   said developing means is a Wiener filter.

7. The filter device of claim 6 further including:
   means coupled to said combining means for reshaping the frequency spectrum of the output signal to conform to a desired signal spectrum.

8. The filter device of claim 5 wherein said developing means comprises:
   an adaptive transversal filter having adjustable coefficients, said transversal filter changing each of its coefficients as a function of the output signal in order to develop the least mean square estimate.

9. The filter device of claim 5 wherein said developing means comprises:
   an adaptive transversal filter having adjustable coefficients; and
   means for multiplying the output signal by a multiplier signal to develop a product signal, said transversal filter changing each of its coefficients as a function of the product signal in order to develop the least mean square estimate.

10. The filter device of claim 9 further including
    means for automatically adjusting the amplitude of the multiplier signal as a function of the input power level of the input signal.

11. A machine method for removing undesired correlated components from an input audio signal comprising the steps of:
    developing a least means square estimate of the undesired correlated components in the input audio signal; and
    subtracting the least mean square estimate from the input audio signal to develop an output audio signal containing substantially no undesired correlated components.

12. A machine method for removing undesired correlated components from an input degraded voice signal comprising the steps of:
    producing an estimate of the undesired correlated components; and
    combining the estimate of the undesired correlated components with the degraded voice signal to develop an output voice signal with the undesired correlated components removed.

* * * * *